United States Patent
Brine et al.

(10) Patent No.: US 9,481,050 B2
(45) Date of Patent: Nov. 1, 2016

(54) PLASMA ARC CUTTING SYSTEM AND PERSONA SELECTION PROCESS

(71) Applicant: Hypertherm, Inc., Hanover, NH (US)

(72) Inventors: Erik Brine, Hanover, NH (US); Jesse A. Roberts, Cornish, NH (US); Junsong Mao, Hanover, NH (US); Michael Hoffa, Lebanon, NH (US); Clayton Gould, Orford, NH (US); Peter Twarog, West Lebanon, NH (US); E. Michael Shipulski, Etna, NH (US); Stephen M. Liebold, Grantham, NH (US); Brett Andrew Hansen, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 384 days.

(21) Appl. No.: 13/949,364

(22) Filed: Jul. 24, 2013

(65) Prior Publication Data
US 2015/0027998 A1  Jan. 29, 2015

(51) Int. Cl.
*B23K 10/00* (2006.01)
(52) U.S. Cl.
CPC ............. *B23K 10/006* (2013.01); *B23K 10/00* (2013.01)
(58) Field of Classification Search
CPC ...... B23K 10/006; B23K 10/00; H05H 1/26; H05H 1/34
USPC ............ 219/121.44, 121.54, 121.55, 121.57, 219/121.45, 121.48, 121.59; 313/231.41, 313/231.51; 315/111.21
See application file for complete search history.

(56) References Cited

U.S. PATENT DOCUMENTS

| | | |
|---|---|---|
| 2,985,050 A | 5/1961 | Schwacha |
| 5,018,670 A | 5/1991 | Chalmers |
| 5,086,655 A | 2/1992 | Fredericks et al. |
| 5,309,683 A | 5/1994 | Hockett |
| 5,381,487 A | 1/1995 | Shamos |
| 5,388,965 A | 2/1995 | Fehn |
| 5,390,964 A | 2/1995 | Gray, Jr. |
| 5,440,477 A | 8/1995 | Rohrberg et al. |
| 5,500,512 A | 3/1996 | Goldblatt |
| 5,556,562 A | 9/1996 | Sorenson |
| 5,653,264 A | 8/1997 | Atkinson |
| 5,860,849 A | 1/1999 | Miller |

(Continued)

FOREIGN PATENT DOCUMENTS

| | | |
|---|---|---|
| CA | 2439213 | 10/2006 |
| EP | 508482 | 10/1992 |

(Continued)

OTHER PUBLICATIONS

TRUMPF Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).

(Continued)

*Primary Examiner* — Mark Paschall
(74) *Attorney, Agent, or Firm* — Proskauer Rose LLP

(57) ABSTRACT

The invention features methods and apparatuses for establishing operational settings of a plasma arc cutting system. A plasma power supply includes a user selectable control. The user selectable control enables selection of a single cutting persona that establishes at least a current, a gas pressure or gas flow rate, and an operational mode of the plasma arc cutting system.

30 Claims, 4 Drawing Sheets

(56) References Cited

U.S. PATENT DOCUMENTS

| | | | |
|---|---|---|---|
| 6,133,542 A | 10/2000 | Dvorak et al. | |
| 6,267,291 B1 | 7/2001 | Blankenship et al. | |
| 6,326,583 B1 | 12/2001 | Hardwick et al. | |
| 6,409,476 B2 | 6/2002 | Mills | |
| 6,479,793 B1 | 11/2002 | Wittmann et al. | |
| 6,510,984 B2 | 1/2003 | Blankenship et al. | |
| 6,693,252 B2 | 2/2004 | Zhang et al. | |
| 6,717,096 B2 | 4/2004 | Hewett et al. | |
| 6,772,040 B1 | 8/2004 | Picard et al. | |
| 6,781,085 B2 | 8/2004 | Ulrich et al. | |
| 6,933,462 B2 | 8/2005 | Iriyama et al. | |
| 6,960,737 B2 | 11/2005 | Tatham | |
| 6,992,262 B2 | 1/2006 | Matus et al. | |
| 6,995,545 B2 | 2/2006 | Tracy et al. | |
| 7,030,337 B2 | 4/2006 | Baker et al. | |
| 7,032,814 B2 | 4/2006 | Blankenship | |
| 7,115,833 B2 | 10/2006 | Higgins et al. | |
| 7,186,944 B2 | 3/2007 | Matus et al. | |
| 7,375,302 B2 | 5/2008 | Twarog et al. | |
| 7,411,154 B2 | 8/2008 | Fosbinder et al. | |
| 8,203,095 B2 | 6/2012 | Storm et al. | |
| 8,204,618 B2 | 6/2012 | Young, Jr. et al. | |
| 8,263,896 B2 | 9/2012 | Schneider | |
| 8,278,588 B2 | 10/2012 | Salsich et al. | |
| 8,373,084 B2 | 2/2013 | Salsich | |
| 8,395,076 B2 | 3/2013 | Matus | |
| 8,686,318 B2 | 4/2014 | Albrecht | |
| 8,748,776 B2 | 6/2014 | Albrecht | |
| 8,766,132 B2 | 7/2014 | Blankenship et al. | |
| 8,859,828 B2 | 10/2014 | Liu et al. | |
| 8,859,928 B2 | 10/2014 | Sommerfeld | |
| 9,129,330 B2 | 9/2015 | Albrecht et al. | |
| 2003/0025598 A1 | 2/2003 | Wolf et al. | |
| 2003/0148709 A1 | 8/2003 | Anand et al. | |
| 2004/0031776 A1 | 2/2004 | Gevelber et al. | |
| 2005/0109738 A1 | 5/2005 | Hewett et al. | |
| 2006/0070986 A1 | 4/2006 | Ihde et al. | |
| 2006/0163230 A1 | 7/2006 | Kaufman | |
| 2006/0201923 A1 | 9/2006 | Hutchison | |
| 2006/0289406 A1 | 12/2006 | Helenius et al. | |
| 2007/0012099 A1 | 1/2007 | Becourt | |
| 2007/0051711 A1 | 3/2007 | Kachline | |
| 2007/0080149 A1 | 4/2007 | Albrecht | |
| 2007/0080150 A1 | 4/2007 | Albrecht | |
| 2007/0080151 A1 | 4/2007 | Albrecht | |
| 2007/0080152 A1 | 4/2007 | Albrecht | |
| 2007/0080153 A1 | 4/2007 | Albrecht et al. | |
| 2007/0294608 A1 | 12/2007 | Winterhalter et al. | |
| 2008/0011821 A1 | 1/2008 | Ellender et al. | |
| 2008/0061049 A1 | 3/2008 | Albrecht | |
| 2008/0093476 A1 | 4/2008 | Johnson et al. | |
| 2008/0149608 A1 | 6/2008 | Albrecht | |
| 2008/0149686 A1 | 6/2008 | Daniel et al. | |
| 2008/0156783 A1 | 7/2008 | Vanden Heuvel | |
| 2008/0223952 A1 | 9/2008 | Wernli et al. | |
| 2008/0257874 A1 | 10/2008 | Kaufman et al. | |
| 2008/0308641 A1 | 12/2008 | Finn | |
| 2009/0008370 A1 | 1/2009 | Salsich et al. | |
| 2009/0065489 A1 | 3/2009 | Duffy | |
| 2009/0107960 A1 | 4/2009 | Hampton | |
| 2009/0159575 A1 | 6/2009 | Salsich | |
| 2009/0163130 A1 | 6/2009 | Zambergs | |
| 2009/0184098 A1 | 7/2009 | Daniel et al. | |
| 2009/0212027 A1 | 8/2009 | Borowy | |
| 2009/0288532 A1 | 11/2009 | Hashish | |
| 2010/0155377 A1 | 6/2010 | Lindsay et al. | |
| 2010/0324868 A1 | 12/2010 | Russell et al. | |
| 2011/0000893 A1 | 1/2011 | Blankenship et al. | |
| 2011/0114616 A1 | 5/2011 | Albrecht | |
| 2011/0163857 A1 | 7/2011 | August et al. | |
| 2011/0294401 A1 | 12/2011 | Habermann et al. | |
| 2012/0021676 A1 | 1/2012 | Schubert et al. | |
| 2012/0138583 A1 | 6/2012 | Winn et al. | |
| 2012/0241428 A1 | 9/2012 | Kowaleski | |
| 2013/0068732 A1 | 3/2013 | Watson et al. | |
| 2013/0210319 A1 | 8/2013 | Gramling et al. | |
| 2013/0263420 A1 | 10/2013 | Shipulski | |
| 2013/0264317 A1 | 10/2013 | Hoffa et al. | |
| 2013/0264320 A1 | 10/2013 | Shipulski et al. | |
| 2014/0335761 A1 | 11/2014 | Chou et al. | |

FOREIGN PATENT DOCUMENTS

| | | |
|---|---|---|
| EP | 1065620 | 1/2001 |
| EP | 1117279 | 7/2001 |
| EP | 1288016 | 3/2003 |
| EP | 1516688 | 3/2005 |
| EP | 1522371 | 4/2005 |
| JP | S61-63368 | 4/1986 |
| WO | 2008/144785 | 12/2008 |
| WO | 2009/142941 A2 | 11/2009 |
| WO | 2010/142858 | 12/2010 |
| WO | 2013/000700 | 1/2013 |
| WO | 2013/151602 | 10/2013 |
| WO | 2013/151886 | 10/2013 |

OTHER PUBLICATIONS

Torchmate Arc Voltage Torch Height Control—Operation Manual, Applied Robotics, Inc., Oct. 2005, pp. 1-19.

PLASMA ARC CUTTING SYSTEM AND PERSONA SELECTION PROCESS

FIELD OF THE INVENTION

The invention relates generally to the field of plasma arc cutting systems and processes. More specifically, the invention relates to improved user-selection methods and apparatuses for establishing cutting parameters of plasma arc cutting systems.

BACKGROUND

Plasma arc torches are widely used in the cutting and marking of materials. A plasma torch generally includes an electrode and a nozzle having a central exit orifice mounted within a torch body, electrical connections, passages for cooling, and passages for arc control fluids (e.g., plasma gas). The torch produces a plasma arc, a constricted ionized jet of a gas with high temperature and high momentum. Gases used in the torch can be non-reactive (e.g., argon or nitrogen) or reactive (e.g., oxygen or air). During operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

Known plasma cutting systems include a control panel on the power supply including a manual gas adjustment knob, a mode selector, and a status screen. To operate the plasma system, an operator can manually select a cutting current, a gas pressure or gas flow rate, and a cutting mode based upon the desired cutting operation. These systems require operator training and repeated reference to process parameters materials (e.g., cut charts) to use the plasma cutting system.

What is needed is a plasma arc cutting system that establishes multiple cutting parameters appropriate for a particular cutting task based upon selection of a single intuitive indication of the cut to be performed (e.g. a cutting persona).

SUMMARY OF THE INVENTION

The present invention relates to systems and methods for establishing in a plasma arc cutting system, through selection of a single cutting persona, at least (i) a cutting current, (ii) a gas pressure or gas flow rate, and (iii) an operational mode for the plasma arc cutting system. The present invention, in one detailed embodiment, enables selection of a cutting persona with minimal action by the system operator (e.g., the manipulation of a dial, the selection of a menu option, etc.). A "cutting persona" is a set of parameters for a plasma arc cutting system that are customized for a particular kind of cut. For example, one user may want to cut as fast as possible and sacrifice consumable life. For this type of cut, a cutting persona that establishes a high current and gas flow can be desirable. Another user, such as one who is using a computer numeric controller ("CNC")-controlled table mounted system, may want to select a cutting persona optimized for long life or fine cutting. For this type of cut, a cutting persona that establishes a low current and/or gas flow rate can be desirable.

Configuring a plasma arc cutting system with cutting personas can make it easier for optimal cutting parameters to be chosen based on the desired cut. Several cutting persona options can be provided with minimal operator activity through a control panel located on a plasma system power supply. The control panel can enable selection of one of a plurality of cutting personas. The power supply can adjust at least the cutting current, the gas pressure or gas flow rate, and the operational mode based on the cutting persona selected. Easily identifiable icons can be created and placed on the system to allow users to quickly correlate an icon with a cut to be performed.

In one aspect, the invention features a method of establishing operational settings for a plasma arc cutting system. The method includes providing a plasma power supply with a user selectable control. The method also includes enabling selection of a single cutting persona with the user selectable control. Selection of the single cutting persona includes establishing at least a current, a gas pressure or gas flow rate, and an operational mode of the plasma arc cutting system.

In some embodiments, establishing the operational mode includes controlling at least one of current ramping or gas ramping. In some embodiments, establishing the operational mode includes controlling at least one parameter of pilot arc operation. In some embodiments, establishing the operational mode includes controlling power output of the plasma power supply. In some embodiments, the method for establishing operational settings for a plasma arc cutting system includes adjusting at least one operational setting of the plasma arc cutting system based on a workpiece thickness.

In another aspect, the invention features a method of establishing operational settings for a plasma arc cutting system. The method includes providing a plasma power supply in communication with a controller. The method also includes configuring the controller with sets of predetermined operational settings for the plasma arc cutting system. The method also includes enabling user selection of the sets of predetermined operational settings via a single selection dial in communication with the controller. Each of the sets of predetermined operational settings includes settings for establishing at least a current, a gas pressure or gas flow rate, and an operational mode of the plasma arc cutting system.

In some embodiments, at least one of the sets of predetermined operational settings comprises settings for controlling current ramping and/or gas ramping. In some embodiments, at least one of the sets of predetermined operational settings includes settings for controlling pilot arc operation. In some embodiments, at least one of the sets of predetermined operational settings includes settings for controlling power output of the plasma power supply. In some embodiments, the method includes adjusting at least one operational setting of the plasma arc cutting system based on a workpiece thickness.

In another aspect, the invention features a plasma arc cutting system. The plasma arc cutting system includes a power supply for generating a plasma arc. The power supply is capable of establishing at least a current, a gas pressure or gas flow rate, and an operational mode for the plasma arc cutting system. The plasma cutting system includes a user-selectable control in communication with a controller. The controller enables the power supply to establish specific values for the current, the gas pressure or gas flow rate, and the operational mode by selecting a single cutting persona.

In some embodiments, the controller enables selection of at least five distinct cutting personas. In some embodiments, the plasma arc cutting system includes a control panel disposed on the plasma arc cutting system. In some embodiments, the control panel includes the controller and a user interface. In some embodiments, the user interface is an LCD-type user interface.

In some embodiments, the control panel includes at least one dial or button for selecting a cutting persona. In some embodiments, the at least one dial or button is a non-graduated dial. In some embodiments, the control panel includes icons indicative of individual cutting personas. In some embodiments, the control panel includes a manual override feature that allows a user to adjust settings for at least one of the current, the gas pressure or gas flow rate, or the operational mode manually.

In some embodiments, the plasma arc cutting system includes a control for establishing at least one operational setting of the plasma arc cutting system based on a workpiece thickness. In some embodiments, the user-selectable control is located on the power supply. In some embodiments, the user-selectable control includes a microprocessor or a DSP. In some embodiments, the user-selectable control is located on a plasma torch.

In some embodiments, the plasma arc cutting system includes a consumable cartridge that is color coded to correspond to a specific cutting persona. In some embodiments, the plasma arc cutting system includes a hand held plasma torch. In some embodiments, the plasma arc cutting system can change the number of predetermined settings based on the cutting persona selected. In some embodiments, the cutting persona includes predetermined settings for controlling at least one of a current ramping, a gas ramping, or a pilot arc operation. In some embodiments, the cutting persona includes at least one operational setting of the plasma arc cutting system based on a workpiece thickness.

In another aspect, the invention features an operating persona selector for a plasma arc cutting system. The operating persona selector includes a user interface control having a plurality of settings. Each of the settings can correspond to an operating persona. The selection of a single setting can enable a user to choose an operating persona. The operating persona includes operational settings establishing at least a current, a gas pressure or gas flow rate, and an operational mode of the plasma arc cutting system.

In some embodiments, the user interface control includes at least one dial or button for selecting a cutting persona. In some embodiments, the at least one dial or button is a non-graduated dial.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
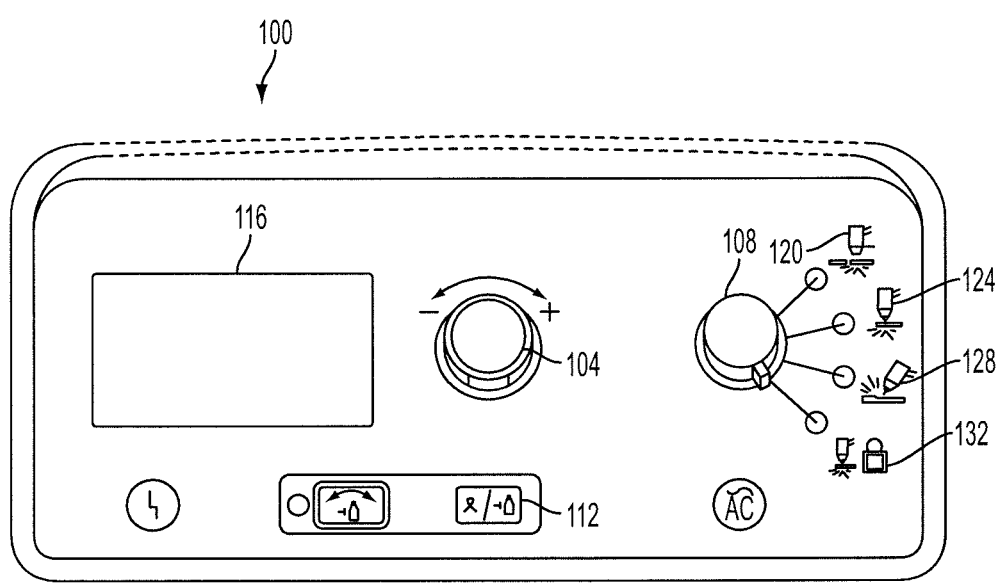
FIG. 1 is an illustration of a prior art control panel for a plasma arc cutting system including a manual gas adjustment knob, a mode selector, and a status screen.

FIG. 1 is an illustration of a prior art control panel 100 for a plasma arc cutting system. The control panel 100 includes an adjustment knob 104, a mode switch 108, a current/gas selector 112 and a status screen 116. In this configuration, an operator adjusts the cutting current and the gas pressure or gas flow rate via the adjustment knob 104. An operator can use the current/gas selector 112 to switch between adjusting the cutting current and the gas pressure or gas flow rate. The operator can also adjust the cutting mode via the mode switch 108. The mode switch 108 can allow the plasma arc cutting system to operate in four modes: constant pilot arc ("CP") mode 120; cutting mode 124; gouge mode 128; and trigger lock mode 132.

Using this setup the operator must constantly refer to a chart of cutting process parameters (e.g. current, gas pressure or gas flow rate, and/or cutting mode) for each type of cut performed. Moreover, if the operator inadvertently inputs an incorrect parameter, the plasma arc torch can operate incorrectly or inefficiently (e.g. it can produce more waste from scrapped work; it can require more effort to clean or fix the cut edge; and/or it can take a longer time to perform the cut or gouge task). Thus, training costs for plasma cutting machine operators can be high.

Figure 2:
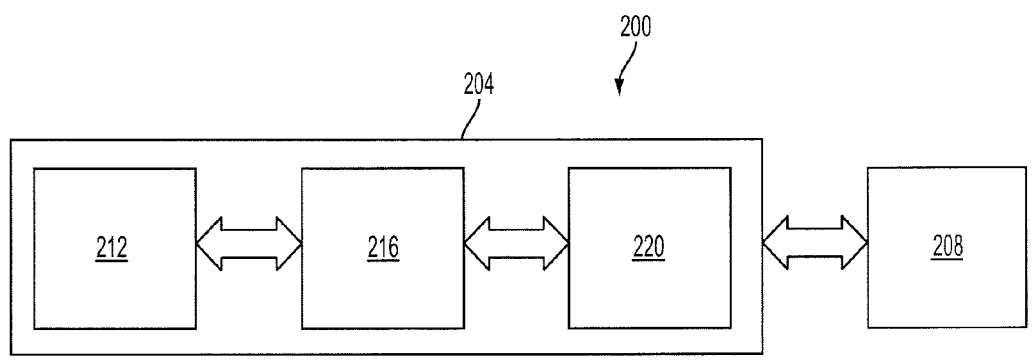
FIG. 2 is a schematic of a plasma arc cutting system, according to an illustrative embodiment of the invention.

FIG. 2 is a schematic of a plasma arc cutting system 200, according to an illustrative embodiment of the invention. The plasma arc cutting system 200 comprises a plasma system power supply 204 and a plasma arc torch 208. The plasma system power supply 204 is in communication with the torch 208. The plasma system power supply 204 can enable an operator to select a single cutting persona that establishes multiple cutting parameters, e.g. a cutting current, a gas pressure or gas flow rate, and/or a cutting mode. The cutting parameters can be customized for a particular cutting task. For example, regular, light-duty hand cutting can require a lower current and gas flow rate than heavier duty cutting.

The plasma system power supply 204 includes a control panel 212, a controller 216, and power circuitry 220. The control panel 212 is in communication with the controller 216. The control panel 212 enables user selection of one of the cutting personas (e.g. as described below in FIGS. 3A-3B). Selection of a single cutting persona via the control panel 212 enables the controller 216 to establish multiple cutting parameters for a plasma arc cutting system, e.g. a cutting current, a gas pressure or gas flow rate, and/or a cutting mode. The controller 216 is in communication with power circuitry 220, which can provide the cutting current. The controller 216 is also in communication with a gas valve (not shown) that can adjust the gas pressure or gas flow rate.

In some embodiments, the control panel 212 enables selection of at least five distinct cutting personas. In some embodiments, the cutting personas can be named or otherwise correlated with intuitive indicators of cutting tasks to be performed (e.g. labels, icons, color swatches, etc). Intuitive indications based on the desired cutting task can allow a user to cut without having to ascertain or specify the appropriate cutting parameters, for example by consulting a lookup table. Thus, the intuitive indications can save the operator time and can ensure a proper cut is performed without wasting workpiece material.

In some embodiments, establishing the cutting mode comprises setting different parameters depending on the particular cutting mode selected. In some embodiments, establishing the cutting mode comprises controlling current ramping and/or gas ramping. In some embodiments, establishing the cutting mode comprises controlling at least one parameter of pilot arc operation such as pilot current, pilot duration, pilot ramping and gas flow rate during piloting. In some embodiments, establishing the operational mode further comprises controlling power output of the plasma system power supply 204. In some embodiments, the cutting mode is characterized by the manner in which the arc interacts with the workpiece such as enabling more arc stretch or varying air flow to change the characteristics of the arc and the corresponding effect on the workpiece (e.g. a wider gouge from a less constricted arc).

In some embodiments, the cutting personas correspond to processes besides plasma cutting, e.g. gouging and/or heating. In some embodiments, multiple cutting personas exist for the processes of gouging and/or heating. For example, a highly controllable gouging process may require different parameters than a rapid material removal gouging process, and a separate persona can exist for each. In some embodiments, the plasma system power supply 204 can change the number of operating parameters based on the cutting persona selected, in addition to the values of specific cutting parameters.

In some embodiments, consumable components can be designed to correlate with a particular cutting persona so that the desired cutting performance can be maximized by choosing an optimal combination of cutting parameters and consumable design. In some embodiments, a user can select a cutting persona that corresponds with a consumable set or consumable cartridge. For example, a consumable set or consumable cartridge can be marked as "Heavy Duty." In some embodiments, consumable cartridges can be color-coded to correspond with cutting personas, e.g., a red color can correspond to a "Heavy Duty" persona; a blue color can correspond to a "Fine Cut" cutting persona; and/or an orange color can correspond to a "Long Life" cutting persona, etc. Once the cartridge is installed the user can select the persona corresponding to the color of the cartridge installed.

In some embodiments, the plasma system power supply 204 is a power printed circuit board ("PCB") that can comprise most of the power components. In some embodiments, the controller 216 is a microcontroller, a central processing unit ("CPU") controller, a digital signal processor ("DSP") controller, or any other type of controller that is capable of controlling the cutting current and/or the gas flow rate. A DSP PCB can be used as the controller 216 and can be attached to the power PCB. In some embodiments, the plasma system power supply 216 is controlled by a remote controller, for example, a CNC.

In some embodiments, the controller establishes a plurality of cutting parameters using a predefined parameter table that can be stored in memory. The memory can be disposed within the plasma arc cutting system 200, e.g. in the plasma system power supply 204. The memory can be in communication with the controller 216. The predefined parameter table can be pre-loaded into the plasma arc cutting system 200 and can enable the controller to look up various variables or operating parameters. The parameters can be indexed by the cutting personas to which they correspond.

Table 1 shows a sample list of cutting personas and the accompanying adjustments to various plasma cutting parameters that selection of each cutting persona enables. Table 1 is meant for illustrative purposes only and should not be construed as limiting the present invention.

TABLE 1

| Cutting Persona | Adjustments to plasma system operating parameters |
| --- | --- |
| Regular, light duty hand cutting | Lower power and gas flow required to accomplish the cutting task |
| Heavy duty hand cutting | More power and gas flow required to accomplish the cutting task; Increased arc stretch |
| Fine cutting | Low amperage/low speed cutting for fine features; Lower current |
| Long life cutting | Settings optimized for prolonging consumable life, including power and gas ramp up and ramp down to minimize electrode hafnium erosion; Turn off contain pilot arc circuit; turn down pilot current; reduce pilot time-out (currently allowed 5 seconds of pilot time) |
| Non-transfer arc mode (e.g. cutting insulation) | Cutting non-conductive material with non-transferred arc; No pilot timeout |
| Constant Arc mode | Arc stays on, no pilot timeout, robust against pop-outs; Turn off transfer switch; Adjust shutoff thresholds (current and voltage) |
| Extra fast/Speed | Maximum power and gas flow for the fastest cut possible; Higher current |
| Thick metal cutting | Maximum power and gas flow for the thickest cut possible; Higher power (voltage and current) |
| Thin metal cutting | Low amperage cutting for better cut quality on thin material with less fumes and energy use; Constant Kilowatt output setting (fold-back algorithms) |
| Gouging—max removal | High amperage and gas flow gouging for maximum metal removal; Change current and flow |
| Gouging—max control | Low amperage gouging for maximum control of the arc while gouging; Constant power algorithm to give constant control |
| Marking | Extra low amperage and gas flow settings for marking of metal with the plasma or pilot arc; Lower current, different gas flows |
| Rough cutting | Maximum speed and thickness settings and consumable design not limited by design for cut quality; Higher gas flow |
| Green mode | Lowest power and gas flow required to get the job done to minimize fumes and energy use; Lower power |
| High access cutting | Higher power and flow rate to enable more arc stretch |
| Quiet mode | Lower flow rate, lower fan speed |

Figure 3A:
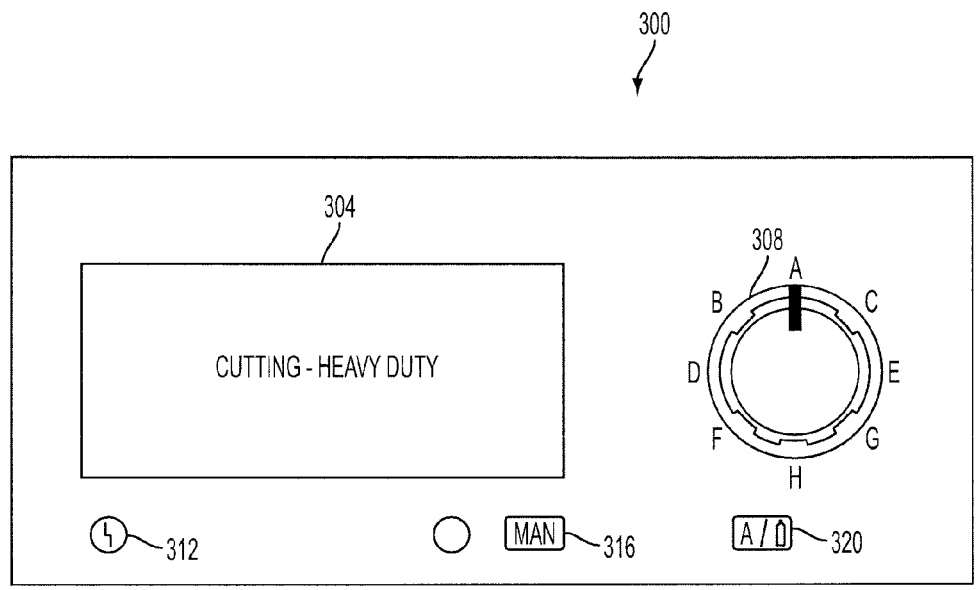
FIG. 3A is an illustration of a control panel for a plasma arc cutting system including a persona selector, according to an illustrative embodiment of the invention.

FIG. 3A is an illustration of a control panel 300 for a plasma arc cutting system (e.g. plasma arc cutting system 200 as shown above in FIG. 2), according to an illustrative embodiment of the invention. The control panel 300 includes a user interface 304 and a persona selector 308. The user interface 304 can be a LCD-type user interface, an LED-type user interface, a computer screen, a touch screen display, a video display, or any other type of user interface. The persona selector 308 can be a knob or a dial, e.g. a non-graduated dial. The control panel 300 can also include, for example, a fault LED 312, a manual override feature 316, and a current/pressure selection button 320. Although certain features of the control panel 300 are shown using knobs and buttons, any type of mechanism can be used (for example, dials knobs, buttons, slide bars, toggles, keys, touch screens, switches, or any combination thereof).

In some embodiments, the user interface 304 is capable of displaying a description of the cutting persona selected to provide more detail to the user regarding the cutting persona selected. In some embodiments, the description comprises an intuitive indication of a plasma cutting process to be performed and/or the specific cutting parameters associated with the cutting persona. In some embodiments, the persona selector 308 enables selection of discrete options, e.g. A, B, C, D, E, F, G, H as shown in FIG. 3A. In some embodiments, the letters A, B, C, D, E, F, G, H are replaced with colors swatches, icons, or other indicators that correlate with particular cutting personas. In some embodiments, the icons are easily identifiable and/or intuitive indicators. In some embodiments, the user interface 304 is disposed on the plasma system power supply. In some embodiments, the user interface 304 is disposed on the torch.

In some embodiments the manual override feature 316 allows the user to select one or more cutting parameters manually. When the operator exits manual mode, memory can store the manual settings that were entered by the user and display those settings when the operator returns to manual mode. In some embodiments, the manual override feature 316 is a button. In some embodiments, the fault LED 312 illuminates if a fault or error occurs within the plasma arc cutting system to alert the operator that something is wrong with the plasma arc cutting system.

Figure 3B:
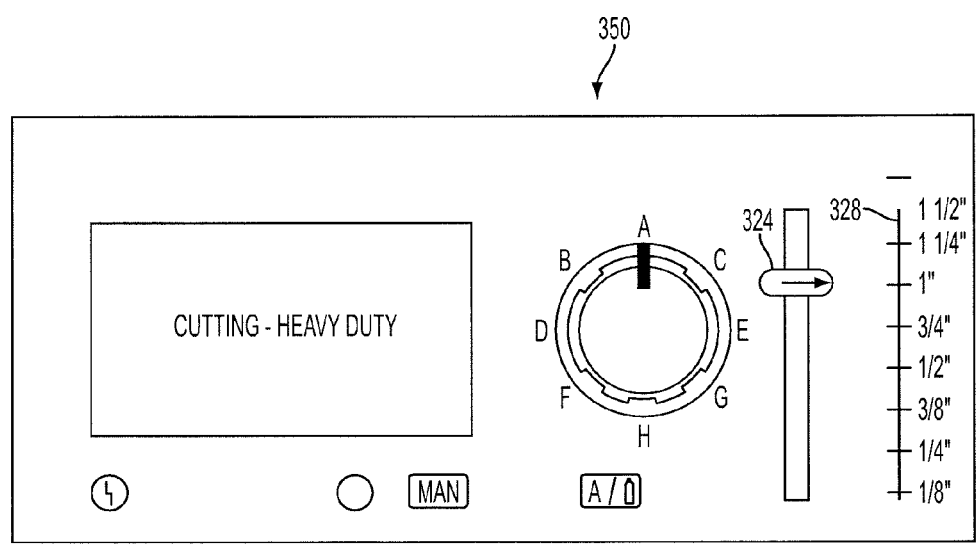
FIG. 3B is an illustration of a control panel for a plasma arc cutting system including a persona selector and a control for adjusting an operational setting based on a workpiece thickness, according to an illustrative embodiment of the invention.

FIG. 3B is an illustration of a control panel 350 for a plasma arc cutting system (e.g. plasma arc cutting system 200 as shown above in FIG. 2), according to an illustrative embodiment of the invention. The control panel 350 includes a control 324 for adjusting at least one cutting parameter of the cutting persona based on a workpiece thickness. The user can select the desired cutting persona and then select the material thickness of the workpiece, allowing the cutting persona parameters to be further customized based on the thickness of the material to be cut. A thickness indicator scale 328 allows the user to visualize the thickness selected by the control 324.

In some embodiments, the control 324 is a sliding bar thickness selector. In some embodiments, specific consumable cartridges correspond to particular ranges of thicknesses for each cutting persona. In some embodiments, the consumable cartridges are chosen by cutting or gouging type. In some embodiments, the consumable cartridges are color-coded and/or have the material thickness range printed on the cartridge.

Figure 4:
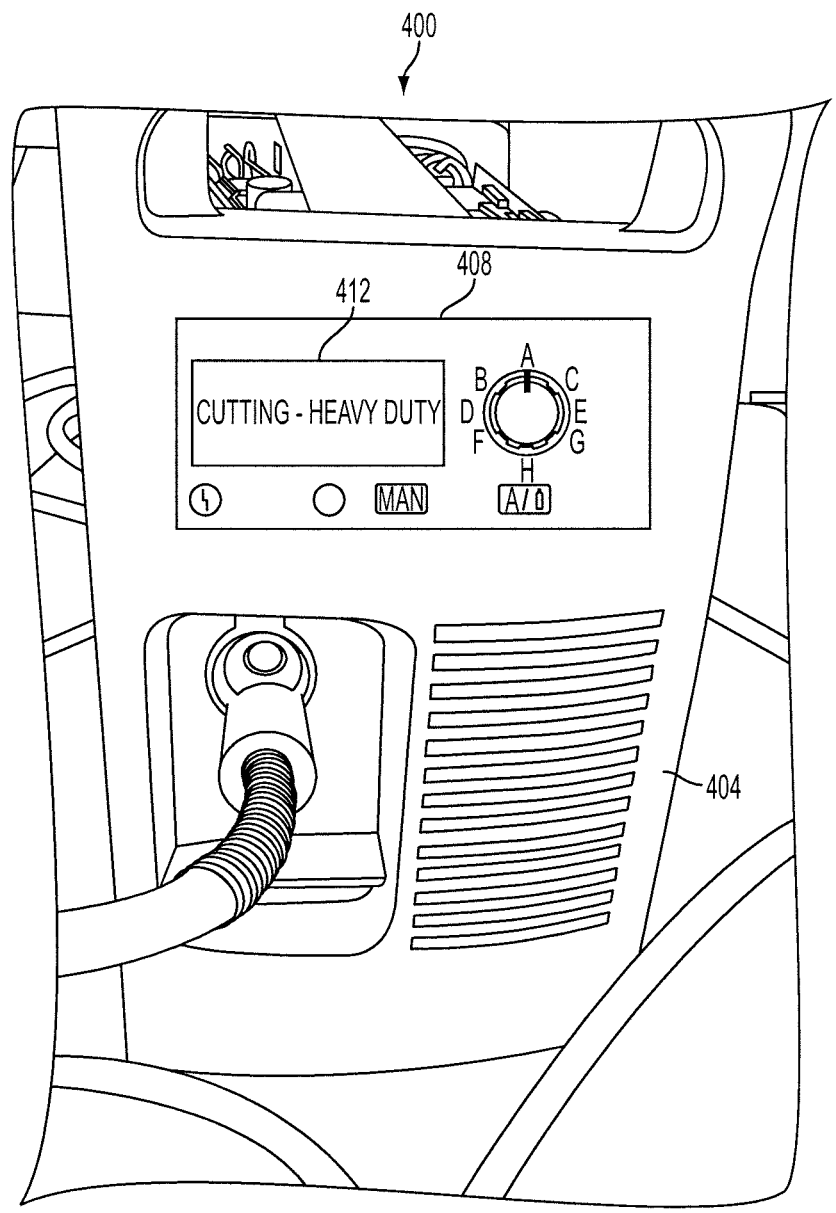
FIG. 4 is an illustration of a portable plasma arc cutting system, according to an illustrative embodiment of the invention.

FIG. 4 is an illustration of a portable plasma arc cutting system 400, according to an illustrative embodiment of the invention. The portable plasma arc cutting system 400 includes an outer casing 404 that can house a power supply, a gas valve, and/or a controller. The portable plasma arc cutting system 400 can include a control panel 408 disposed on the plasma arc cutting system 400 that comprises a user interface 412. In some embodiments, the control panel 408 can be located on the power supply. In some embodiments, the control panel 408 can be located on a plasma torch (not shown).

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A method of establishing operational settings for a plasma arc cutting system, the method comprising:
   providing a plasma power supply with a user selectable control;
   enabling a plurality of cutting personas with the user selectable control, each cutting persona comprising a set of parameters customized for a particular kind of cut each cutting persona including at least: (1) a current, (2) a gas pressure or a gas flow rate, and (3) at least one parameter of an operational mode; and
   selecting one of the cutting personas from the plurality of cutting personas via the user-selectable control, thereby setting each of the parameters within the set of parameters defined by the cutting persona in one action to minimize operator activity.

2. The method of claim 1 wherein establishing at least one parameter of the operational mode further comprises controlling at least one of current ramping or gas ramping.

3. The method of claim 1 wherein establishing at least one parameter of the operational mode further comprises controlling at least one parameter of pilot arc operation.

4. The method of claim 1 wherein establishing at least one parameter of the operational mode further comprises controlling power output of the plasma power supply.

5. The method of claim 1 further comprising adjusting at least one operational setting of the plasma arc cutting system based on a workpiece thickness.

6. A method of establishing operational settings for a plasma arc cutting system, the method comprising:
   providing a plasma power supply in communication with a controller;
   configuring the controller with a plurality of sets of predetermined operational settings for the plasma arc cutting system;
   enabling user selection of the sets of predetermined operational settings via a single selection dial in communication with the controller; and
   selecting one set of predetermined operational settings from the plurality of sets of predetermined operational settings via the single selection dial, thereby setting each of the parameters within the selected set of predetermined operational settings to minimize operator activity,
   wherein each of the sets of predetermined operational settings is customized for a particular kind of cut and comprises settings for establishing at least a current, a gas pressure or gas flow rate, and at least one parameter of an operational mode of the plasma arc cutting system.

7. The method of claim 6 wherein at least one of the sets of predetermined operational settings comprises settings for controlling current ramping and/or gas ramping.

8. The method of claim 6 wherein at least one of the sets of predetermined operational settings comprises settings for controlling pilot arc operation.

9. The method of claim 6 wherein at least one of the sets of predetermined operational settings comprises settings for controlling power output of the plasma power supply.

10. The method of claim 6 further comprising adjusting at least one operational setting of the plasma arc cutting system based on a workpiece thickness.

11. A plasma arc cutting system comprising:
- a power supply for generating a plasma arc, the power supply capable of establishing at least a current, a gas pressure or gas flow rate, and an operational mode for the plasma arc cutting system;
- a user-selectable control in communication with a controller, the controller enabling the power supply to establish a plurality of cutting personas, each cutting persona comprising specific values for the current, the gas pressure or gas flow rate, and at least one parameter of the operational mode, via a user's selecting one of the cutting personas from the plurality of cutting personas in one action to minimize operator activity;
- wherein the plurality of cutting personas are enabled with the user-selectable control, each cutting persona customized for a particular kind of cut.

12. The plasma arc cutting system of claim 11 wherein the controller enables selection of at least five distinct cutting personas.

13. The plasma arc cutting system of claim 11, further comprising a control panel disposed on the plasma arc cutting system, the control panel comprising the controller and a user interface.

14. The plasma arc cutting system of claim 13 wherein the user interface is an LCD-type user interface.

15. The plasma arc cutting system of claim 13 wherein the control panel further comprises at least one dial or button for selecting a cutting persona.

16. The plasma arc cutting system of claim 15 wherein the at least one dial or button is a non-graduated dial.

17. The plasma arc cutting system of claim 15 wherein the control panel further comprises icons indicative of individual cutting personas.

18. The plasma arc cutting system of claim 13 wherein the control panel further comprises a manual override feature that allows a user to adjust settings for at least one of the current, the gas pressure or gas flow rate, or the operational mode manually.

19. The plasma arc cutting system of claim 11, further comprising a control for establishing at least one operational setting of the plasma arc cutting system based on a workpiece thickness.

20. The plasma arc cutting system of claim 11 wherein the user-selectable control is located on the power supply.

21. The plasma arc cutting system of claim 11 wherein the user-selectable control is located on a plasma torch.

22. The plasma arc cutting system of claim 11 wherein the controller comprises a microprocessor or DSP.

23. The plasma arc cutting system of claim 11, further comprising a consumable cartridge that is color coded to correspond to a specific cutting persona.

24. The plasma arc cutting system of claim 11 further comprising a hand held plasma torch.

25. The plasma arc cutting system of claim 11 wherein the plasma cutting system can change the number of predetermined settings based on the cutting persona selected.

26. The plasma arc cutting system of claim 11 wherein the cutting persona further comprises predetermined settings for controlling at least one of a current ramping, a gas ramping, or a pilot arc operation.

27. The plasma arc cutting system of claim 11 wherein the cutting persona further comprises at least one operational setting of the plasma arc cutting system based on a workpiece thickness.

28. An operating persona selector for a plasma arc cutting system, comprising:
- a user interface control having a plurality of settings each corresponding to an operating persona; and
- a plurality of operating personas enabled with the user interface control, enabling a user to select one of the operating personas via the user interface control from the plurality of operating personas in one action, to minimize operator activity,
- each operating persona comprising a set of parameters customized for a particular kind of cut and establishing at least a current, a gas pressure or a gas flow rate, and at least one parameter of an operational mode.

29. The operating persona selector of claim 28 wherein the user interface control further comprises at least one dial or button for selecting a cutting persona.

30. The operating persona selector of claim 29 wherein the at least one dial or button is a non-graduated dial.

* * * * *